(12) United States Patent
Kim et al.

(10) Patent No.: US 10,302,183 B2
(45) Date of Patent: May 28, 2019

(54) PLANETARY GEAR TRAIN OF AUTOMATIC TRANSMISSION FOR VEHICLES

(71) Applicant: HYUNDAI MOTOR COMPANY, Seoul (KR)

(72) Inventors: Jong Soo Kim, Seoul (KR); Dong Hwan Hwang, Seoul (KR); Jong Sool Park, Hwaseong-si (KR); Kyeong Hun Lee, Seoul (KR); Jin Ho Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/376,980

(22) Filed: Dec. 13, 2016

(65) Prior Publication Data

US 2018/0100568 A1    Apr. 12, 2018

(30) Foreign Application Priority Data

Oct. 12, 2016    (KR) .......................... 10-2016-0132411

(51) Int. Cl.
*F16H 3/66*        (2006.01)
*F16H 37/04*       (2006.01)

(52) U.S. Cl.
CPC .............. *F16H 37/04* (2013.01); *F16H 3/66* (2013.01); *F16H 2037/048* (2013.01); *F16H 2200/0065* (2013.01); *F16H 2200/0069* (2013.01); *F16H 2200/2012* (2013.01); *F16H 2200/2046* (2013.01)

(58) Field of Classification Search
CPC ...... F16H 3/62; F16H 3/66; F16H 2200/2012; F16H 2200/2046
See application file for complete search history.

(56) References Cited

U.S. PATENT DOCUMENTS

| | | | |
|---|---|---|---|
| 2005/0181906 A1* | 8/2005 | Park .......................... | F16H 3/66 475/275 |
| 2006/0142111 A1* | 6/2006 | Park .......................... | F16H 3/66 475/269 |
| 2009/0005208 A1* | 1/2009 | Borgerson ................ | F16H 3/66 475/219 |
| 2012/0165154 A1* | 6/2012 | Wittkopp ................ | F16H 3/663 475/296 |
| 2014/0128208 A1* | 5/2014 | Noh .......................... | F16H 3/66 475/311 |

FOREIGN PATENT DOCUMENTS

| | | |
|---|---|---|
| KR | 10-2011-0131817 | 12/2011 |
| KR | 10-1154406 B1 | 6/2012 |
| KR | 10-1317142 | 10/2013 |

\* cited by examiner

*Primary Examiner* — Edwin A Young
(74) *Attorney, Agent, or Firm* — McDonnell Boehnen Hulbert & Berghoff LLP (57) ABSTRACT

Disclosed herein is a planetary gear train that provides at least nine forward speeds and at least one reverse speed by a combination of four planetary gear sets, two transfer gears, and six control elements, thereby providing improvement of power delivery performance and fuel consumption and improving ease of installation by shortening the length of the planetary gear train for an automatic transmission.

17 Claims, 5 Drawing Sheets

| Shift-stage | Control element | | | | | | Gear ratio | Step ratio | Note |
|---|---|---|---|---|---|---|---|---|---|
| | C1 | C2 | C3 | C4 | B1 | B2 | | | |
| D1 | ● | | | | ● | ● | 5.98 | - | |
| D2 | ● | ● | | | ● | | 3.70 | 1.61 | |
| D3 | ● | ● | | ● | ● | | 2.64 | 1.40 | Gear ratio span : 9.76 |
| D4 | | ● | | ● | ● | | 1.79 | 1.47 | |
| D5 | ● | ● | | ● | | | 1.37 | 1.31 | |
| D6 | ● | | ● | ● | | | 1.10 | 1.24 | |
| D7 | ● | | ● | | | | 0.92 | 1.20 | |
| D8 | ● | | ● | | | ● | 0.77 | 1.20 | |
| D9 | ● | ● | | | | ● | 0.61 | 1.26 | |
| REV | | | ● | | ● | ● | -3.74 | - | Ratio of REV vs D1 : -0.63 |

FIG. 3

| Shift-stage | Control element | | | | | | Gear ratio | Step ratio | Note |
|---|---|---|---|---|---|---|---|---|---|
| | C1 | C2 | C3 | C4 | B1 | B2 | | | |
| D1 | ● | | | | ● | ● | 4.41 | - | |
| D2 | ● | ● | | | ● | | 2.74 | 1.61 | |
| D3 | ● | ● | | ● | ● | | 1.98 | 1.38 | |
| D4 | | ● | | ● | ● | | 1.36 | 1.45 | Gear ratio span : 9.85 |
| D5 | ● | ● | ● | ● | | | 1.01 | 1.35 | |
| D6 | ● | | ● | ● | | | 0.84 | 1.21 | |
| D7 | ● | ● | ● | | | | 0.73 | 1.15 | |
| D8 | ● | | | | | ● | 0.61 | 1.19 | |
| D9 | | ● | ● | | | ● | 0.49 | 1.26 | |
| D10 | | ● | ● | | | ● | 0.45 | 1.09 | |
| REV | | | ● | | ● | ● | -2.76 | - | Ratio of REV vs D1 : -0.63 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0132411 filed in the Korean Intellectual Property Office on Oct. 12, 2016, the entire contents of which are incorporated herein by reference.

BACKGROUND (a) Technical Field

The present disclosure relates to an automatic transmission vehicle. More particularly, the present disclosure relates to a planetary gear train for an automatic transmission vehicle, which is capable of implementing nine forward speeds using a minimum number of configurations, improving power transmission performance and fuel efficiency, and improving ease of installation by reducing the length of the planetary gear train.

(b) Description of the Related Art

Recently, increased oil prices have led to highly competitive efforts to enhance the fuel consumption of fossil-fuel burning vehicles.

To improve fuel consumption in automatic transmission vehicles, research has focused on simultaneously providing better drivability and fuel consumption by having more shift stages for the transmission.

Increasing the number of shift stages in an automatic transmission, however, leads to an increase in the number of parts, which leads to higher production costs, higher weight, decreased ease of installation, and decreased power flow efficiency.

Therefore, it is important to develop a planetary gear train for an automatic transmission vehicle having an increased number of shift stages capable of maximizing efficiency using a small number of parts.

An eight-speed automatic transmission has been recently introduced, and a planetary gear train for an automatic transmission enabling more shift stages is under investigation.

An automatic transmission of eight or more shift-stages typically includes three to four planetary gear sets and five to six control elements (frictional elements), and may easily become lengthy, thereby decreasing ease of installation.

Disposing planetary gear sets in parallel or employing dog clutches instead of wet-type control elements is sometimes attempted. However, such an arrangement may not be widely applicable, and using dog clutches may easily deteriorate shift-feel.

In addition, a recent eight-speed automatic transmission typically shows a gear ratio span in a level of 6.5 to 7.5, which may require improvement for better fuel consumption.

Thus, shortening the length of a planetary gear set for an automatic transmission without deteriorating performance will be beneficial.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present disclosure provides a planetary gear train for an automatic transmission vehicle having the advantages of realizing nine forward speeds and one reverse speed through a combination of four planetary gear sets, two external gears and six control elements, thereby providing improvement of power delivery performance and fuel consumption and improving ease of installation by reducing the length of the planetary gear set.

In addition, by utilizing a set of transfer gears, a wide variety of gear teeth may be employed, thereby more easily obtaining optimum gear ratios and improving power delivery performance and fuel consumption.

A planetary gear train for an automatic transmission vehicle according to an example embodiment includes a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; an input shaft mounted with the first, second, and third planetary gear sets on an external circumference of the input shaft; an output shaft disposed in parallel with the input shaft and mounted with the fourth planetary gear set on an external circumference of the output shaft; a first shaft connected with the first rotational element; a second shaft connected with the second rotational element and the fifth rotational element; a third shaft connected with the third rotational element and the input shaft; a fourth shaft connected with the fourth rotational element; a fifth shaft connected with the sixth rotational element and the ninth rotational element; a sixth shaft connected with the seventh rotational element; a seventh shaft connected with the eighth rotational element; an eighth shaft connected with the tenth rotational element and connected with the second shaft by an external gear; a ninth shaft connected with the eleventh rotational element and the output shaft; and a tenth shaft connected with the twelfth rotational element and connected with the seventh shaft by an external gear.

The first shaft may be selectively connected with the fifth shaft and is selectively connected with the sixth shaft; the fourth shaft may be selectively connected to a transmission housing; the fifth shaft may be selectively connected to the transmission housing; and the sixth shaft may be selectively connected with the input shaft.

The fourth planetary gear set may be integrally rotatable by selectively connecting two shafts among the eighth, ninth, and tenth shafts.

The planetary gear train may further include a first clutch arranged between the input shaft and the sixth shaft; a second clutch arranged between the first shaft and the fifth shaft; a third clutch arranged between the first shaft and the sixth shaft; a fourth clutch arranged between the eighth shaft and the tenth shaft; a first brake arranged between the fifth shaft and the transmission housing; and a second brake arranged between the fourth shaft and the transmission housing.

The planetary gear train may further include a first clutch arranged between the input shaft and the sixth shaft; a second clutch arranged between the first shaft and the fifth shaft; a third clutch arranged between the first shaft and the sixth shaft; a fourth clutch arranged between the eighth shaft and the ninth shaft; a first brake arranged between the fifth shaft and the transmission housing; and a second brake arranged between the fourth shaft and the transmission housing.

The planetary gear train may further include a first clutch arranged between the input shaft and the sixth shaft; a second clutch arranged between the first shaft and the fifth shaft; a third clutch arranged between the first shaft and the sixth shaft; a fourth clutch arranged between the ninth shaft and the tenth shaft; a first brake arranged between the fifth shaft and the transmission housing; and a second brake arranged between the fourth shaft and the transmission housing.

The first planetary gear set may comprise a first sun gear as the first rotational element, a first planet carrier as the second rotational element and a first ring gear as the third rotational element. The second planetary gear set may comprise a second sun gear as the fourth rotational element, a second planet carrier as the fifth rotational element, and a second ring gear as the sixth rotational element. The third planetary gear set may comprise a third sun gear as the seventh rotational element, a third planet carrier as the eighth rotational element, and a third ring gear as the ninth rotational element. The fourth planetary gear set may comprise a fourth sun gear as the tenth rotational element, a fourth planet carrier as the eleventh rotational element, and a fourth ring gear as the twelfth rotational element.

The external gears may further include a first transfer gear comprising a first transfer drive gear connected with the second shaft and a first transfer driven gear connected with the eighth shaft so as to be externally gear-meshed with a first transfer drive gear; and a second transfer gear comprising a second transfer drive gear connected with the seventh shaft and a second transfer driven gear connected with the tenth shaft so as to be externally gear-meshed with the second transfer drive gear.

In an example embodiment of a planetary gear train according to the present disclosure, the planetary gear sets are arranged on input and output shafts disposed in parallel, thereby reducing the length of the gear train and improving ease of installation.

In a planetary gear train according to an example embodiment of the present disclosure, nine forward speeds and one reverse speed may be realized by employing two transfer gears in addition to a combination of four planetary gear sets, thereby providing a wide variety of gear teeth so as to easily achieve optimum gear ratio and desired performance characteristics for the vehicle.

In addition, an example planetary gear train may achieve a gear ratio span of more than 9.5 while providing nine forward speeds and one reverse speed, thereby maximizing engine driving efficiency.

Furthermore, the linearity of step ratios of shift stages is secured while multi-staging the shift stage with high efficiency, thereby making it possible to improve drivability such as acceleration before and after a shift, engine speed rhythmic feel, and the like.

Further, effects that can be obtained or expected from example embodiments of the present disclosure are directly or suggestively described in the following detailed description. Various effects expected from example embodiments of the present disclosure are described in the following detailed description.

DESCRIPTION OF SYMBOLS

PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
B1, B2: first and second brakes
C1, C2, C3, C4: first, second, third, and fourth clutches
TF1, TF2: first and second transfer gears
TM1, TM2, TM3, TM4, TM5, TM6, TM7, TM8, TM9, TM10: first, second, third, fourth, fifth, sixth, seventh, eighth, ninth, and tenth shafts

DETAILED DESCRIPTION OF THE EMBODIMENTS

Example embodiments according to the present disclosure are described more fully hereinafter with reference to the accompanying drawings. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to distinguish components having the same name as each other and an where the order thereof is not particularly limited.

Figure 1:
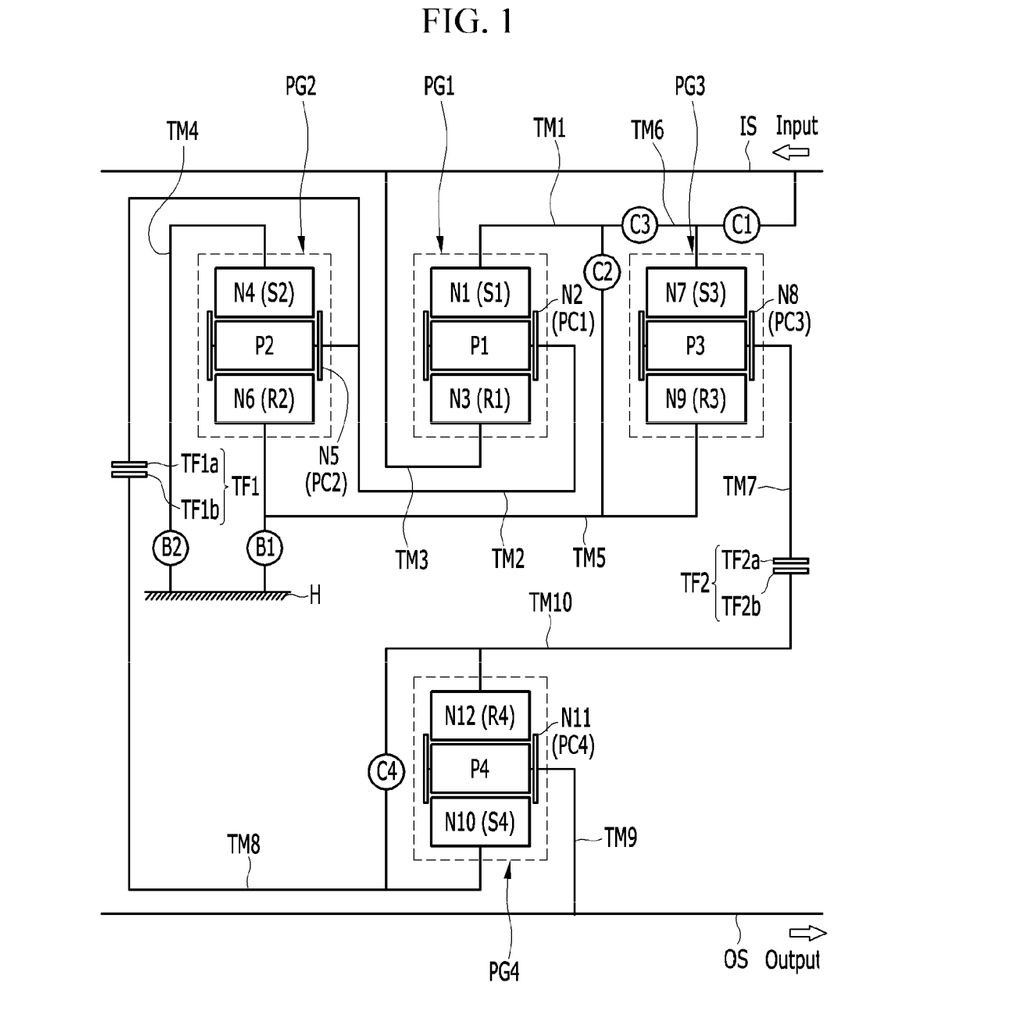
FIG. 1 is a schematic diagram of a planetary gear train according to a first example embodiment.

FIG. 1 is a schematic diagram of a planetary gear train according to a first example embodiment.

Referring to FIG. 1, a planetary gear train according to a first example embodiment includes an input shaft IS; an output shaft OS; first, second, third, and fourth planetary gear sets PG1, PG2, PG3, and PG4; two transfer gears TF1 and TF2; and control elements of four clutches C1, C2, C3 and C4 and two brakes B1 and B2.

Input shaft IS is an input member and the torque from a crankshaft of an engine is input into input shaft IS, after being torque-converted through a torque converter.

Output shaft OS is an output member, and, arranged in parallel with input shaft IS, outputs a shifted driving torque to a drive shaft through a differential apparatus.

First, second, and third planetary gear sets PG1, PG2, and PG3 are on an external circumference of input shaft IS and form a main shifting assembly. Second planetary gear set PG2 is disposed towards a first side of the engine, third planetary gear set PG3 is disposed towards a second side of the engine, and first planetary gear set PG1 is disposed between second planetary gear set PG2 and third planetary gear set PG3.

Fourth planetary gear set PG4 is arranged on an external circumference of output shaft OS disposed in parallel with input shaft IS and forms an auxiliary shifting assembly.

In an example embodiment, first planetary gear set PG1 is a single pinion planetary gear set, and includes a first sun gear S1; a first planet carrier PC1 that supports a plurality of first pinions P1 externally engaged with the first sun gear S1; and a first ring gear R1 that is internally engaged with the plurality of first pinions P1. First sun gear S1 acts as a first rotational element N1; first planet carrier PC1 acts as a second rotational element N2; and first ring gear R1 acts as a third rotational element N3.

In the example embodiment, second planetary gear set PG2 is a single pinion planetary gear set, and includes a second sun gear S2; a second planet carrier PC2 that supports a plurality of second pinions P2 externally engaged with second sun gear S2; and a second ring gear R2 that is internally engaged with the plurality of second pinions P2. Second sun gear S2 acts as a fourth rotational element N4; second planet carrier PC2 acts as a fifth rotational element N5; and second ring gear R2 acts as a sixth rotational element N6.

In the example embodiment, third planetary gear set PG3 is a single pinion planetary gear set, and includes a third sun gear S3; a third planet carrier PC3 that supports a plurality of third pinions P3 externally engaged with third sun gear S3; and a third ring gear R3 that is internally engaged with the plurality of third pinions P3. Third sun gear S3 acts as a seventh rotational element N7; third planet carrier PC3 acts as an eighth rotational element N8; and third ring gear R3 acts as a ninth rotational element N9.

Fourth planetary gear set PG4 is a single pinion planetary gear set, and includes a fourth sun gear S4; a fourth planet carrier PC4 that supports a plurality of fourth pinions P4 externally engaged with fourth sun gear S4; and a fourth ring gear R4 that is internally engaged with the plurality of fourth pinions P4. Fourth sun gear S4 acts as a tenth rotational element N10, fourth planet carrier PC4 acts as an eleventh rotational element N11, and fourth ring gear R4 acts as a twelfth rotational element N12.

In the arrangement of the first, second, and third planetary gear sets PG1, PG2, and PG3, second rotational element N2 is directly connected with fifth rotational element N5 and sixth rotational element N6 is directly connected with ninth rotational element N9, by seven shafts TM1 to TM7.

Three shafts TM8 to TM10 are connected to fourth planetary gear set PG4.

The ten shafts TM1 to TM10 are hereinafter described in detail.

Each of the ten shafts TM1 to TM10 may be a rotational member that directly or selectively interconnects the input and output shafts with the rotational elements of planetary gear sets PG1, PG2, PG3, and PG4, or may be a fixed member that directly or selectively interconnects the rotational elements with a transmission housing H so as to fix the rotational elements.

First shaft TM1 is connected with first rotational element N1 (the first sun gear S1).

Second shaft TM2 is connected with second rotational element N2 (the first planet carrier PC1) and fifth rotational element N5 (the second planet carrier PC2).

Third shaft TM3 is connected with third rotational element N3 (the first ring gear R1), and is directly connected with input shaft IS, thereby always acting as an input element.

Fourth shaft TM4 is connected with fourth rotational element N4 (the second sun gear S2), and is selectively connected to transmission housing H, thereby selectively acting as a fixed element.

Fifth shaft TM5 is connected with sixth rotational element N6 (the second ring gear R2) and ninth rotational element N9 (the third ring gear R3), and is selectively connected with first shaft TM1, and is selectively connected with transmission housing H, thereby selectively acting as a fixed element.

Sixth shaft TM6 is connected with seventh rotational element N7 (the third sun gear S3), and is selectively connected with first shaft TM1, and is selectively connected with input shaft IS, thereby selectively acting as an input element.

Seventh shaft TM7 is connected with eighth rotational element N8 (the third planet carrier PC3).

Eighth shaft TM8 is connected with tenth rotational element N10 (the fourth sun gear S4).

Ninth shaft TM9 is connected with eleventh rotational element N11 (the fourth planet carrier PC4), and is directly connected with output shaft OS, thereby always acting as an output element.

Tenth shaft TM10 is connected with twelfth rotational element N12 (the fourth ring gear R4), and is selectively connected with eighth shaft TM8.

The two transfer gears TF1 and TF2 deliver a shifted torque from the main shifting assembly having the first, second, and third planetary gear sets PG1, PG2, and PG3 to the auxiliary shifting assembly having the fourth planetary gear set PG4, in a reverse rotation.

First transfer gear TF1 includes a first transfer drive gear TF1$a$ connected with second shaft TM2 and a first transfer driven gear TF1$b$ connected with eighth shaft TM8 and externally gear-meshes second shaft TM2 and eighth shaft TM8.

Second transfer gear TF2 includes a second transfer drive gear TF2$a$ connected with seventh shaft TM7 and a second transfer driven gear TF2$b$ connected with tenth shaft TM10 and externally gear-meshes seventh shaft TM7 and tenth shaft TM10.

As a result, respective shafts connected by first and second transfer gears TF1 and TF2 rotate in opposite directions, and the gear ratios of first and second transfer gears TF1 and TF2 may be preset based on a required speed ratio of the transmission.

The control elements include the four clutches C1, C2, C3, and C4 and the two brakes B1 and B2, and are arranged as follows.

First clutch C1 is arranged between input shaft IS and sixth shaft TM6, such that input shaft IS and sixth shaft TM6 may selectively become engaged.

Second clutch C2 is arranged between first shaft TM1 and fifth shaft TM5, such that first shaft TM1 and fifth shaft TM5 may selectively become engaged.

Third clutch C3 is arranged between first shaft TM1 and sixth shaft TM6, such that first shaft TM1 and sixth shaft TM6 may selectively become engaged.

Fourth clutch C4 is arranged between eighth shaft TM8 and tenth shaft TM10, such that eighth shaft TM8 and tenth shaft TM10 may selectively become engaged.

First brake B1 is arranged between fifth shaft TM5 and transmission housing H, such that fifth shaft TM5 may selectively act as a fixed element.

Second brake B2 is arranged between fourth shaft TM4 and transmission housing H, such that fourth shaft TM4 may selectively act as a fixed element.

Fourth clutch C4 selectively connects two of the eighth shaft TM8, the ninth shaft TM9, and the tenth shaft TM10 which are connected with respective rotational elements of fourth planetary gear set PG4, locking the fourth planetary gear set PG4, such that fourth planetary gear set PG4 is integrally rotated.

In an example embodiment, respective control elements including first, second, third, and fourth clutches C1, C2, C3, and C4 and first and second brakes B1 and B2 may be hydraulic pressure friction devices operated by hydraulic pressure supplied from a hydraulic pressure control apparatus. Wet-type, multi-plate hydraulic pressure friction devices are commonly used as control elements, but the control elements may also be friction devices such as dog clutches, electric clutches, magnetic clutches which are operated based on an electrical signal supplied from an electronic control unit apparatus.

Figure 2:
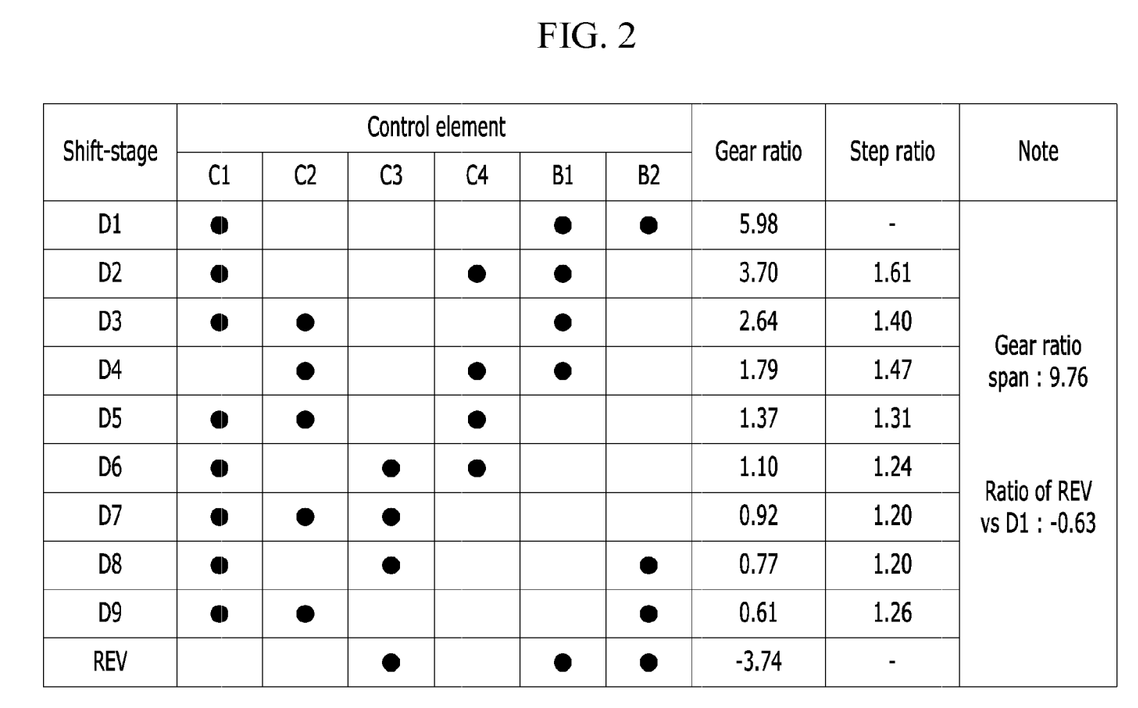
FIG. 2 is an operational chart for the respective control elements at respective shift-stages in a planetary gear train according to a first example embodiment that provides nine forward drive speeds and a reverse speed.

FIG. 2 is an operational chart for the respective control elements at respective shift-stages in a planetary gear train according to a first example embodiment that provides nine forward drive speeds and a reverse speed.

Referring to FIG. 2, the example planetary gear train shifts by operating three control elements among the four clutches C1, C2, C3 and C4 and the two brakes B1 and B2.

In the forward first speed shift-stage D1, first clutch C1 and first and second brakes B1 and B2 are simultaneously operated. As a result, when input shaft IS is connected with sixth shaft TM6 by the operation of first clutch C1, the torque of input shaft IS is input to third shaft TM3 and sixth shaft TM6 in the main shifting assembly. In addition, fifth shaft TM5 and fourth shaft TM4 act as fixed elements together with second planetary gear set PG2 by the operation of first and second brakes B1 and B2, such that the torque being input to sixth shaft TM6 is shifted by third planetary gear set PG3 and then is input to tenth shaft TM10 of the auxiliary shifting assembly through second transfer gear TF2 connected with seventh shaft TM7.

In this configuration, in the auxiliary shifting assembly, eighth shaft TM8 acts as a fixed element together with second shaft TM2 by the operation of first and second brakes B1 and B2, thereby engaging forward first speed by outputting the torque input to tenth shaft TM10 through output shaft OS connected with ninth shaft TM9 after shifting by fourth planetary gear set PG4.

In the forward second speed shift-stage D2, second brake B2 is released and fourth clutch C4 is engaged while controlling the forward first speed shift-stage D1. As a result, when input shaft IS is connected with sixth shaft TM6 by the operation of first clutch C1, the torque of input shaft IS is input to third shaft TM3 and sixth shaft TM6 in the main shifting assembly. In addition, fifth shaft TM5 acts as a fixed element by the operation of first brake B1, such that the torque being input to sixth shaft TM6 is shifted by third planetary gear set PG3 and then is input to tenth shaft TM10 of the auxiliary shifting assembly through second transfer gear TF2 connected with seventh shaft TM7.

In this configuration, in the auxiliary shifting assembly, the rotational elements of fourth planetary gear set PG4 are integrally rotated by the operation of fourth clutch C4, thereby engaging the forward second speed by outputting the shifted torque input to tenth shaft TM10 through output shaft OS connected with ninth shaft TM9 without shifting.

In the forward third speed shift-stage D3, the fourth clutch C4 is released and the second clutch C2 is engages while controlling the forward second speed shift-stage D2. As a result, on when input shaft IS is connected with sixth shaft TM6 by the operation of first clutch C1, the torque of input shaft IS is input to third shaft TM3 and sixth shaft TM6, and first shaft TM1 is connected with fifth shaft TM5 by the operation of second clutch C2 in the main shifting assembly.

At this time, fifth shaft TM5 acts as a fixed element by the operation of first brake B1 together with first shaft TM1, such that the torque being input to sixth shaft TM6 is shifted by third planetary gear set PG3 and then is input to tenth shaft TM10 of the auxiliary shifting assembly through second transfer gear TF2 connected with seventh shaft TM7.

In addition, first shaft TM1 acts as a fixed element by the operation of second clutch C2, such that the torque being input to third shaft TM3 is shifted by first planetary gear set PG1 and then is input to eighth shaft TM8 of the auxiliary shifting assembly through first transfer gear TF1 connected with second shaft TM2.

In this configuration, in the auxiliary shifting assembly, the torques being input to eighth shaft TM8 and tenth shaft TM10 are shifted depending on the difference of rotation speeds, thereby engaging the forward third speed by outputting the shifted torque through output shaft OS connected with ninth shaft TM9.

In the forward fourth speed shift-stage D4, first clutch C1 is released and fourth clutch C4 is engaged while controlling the forward third speed shift-stage D3.

As a result, first shaft TM1 is connected with fifth shaft TM5 by the operation of second clutch C2 in the main shifting assembly. Fifth shaft TM5 acts as a fixed element by the operation of first brake B1 together with first shaft TM1, and first shaft TM1 acts as a fixed element by the operation of second clutch C2, such that the torque being input to third shaft TM3 is shifted by first planetary gear set PG1 and then is input to eighth shaft TM8 of the auxiliary shifting assembly through first transfer gear TF1 connected with second shaft TM2.

In this configuration, in the auxiliary shifting assembly, the rotational elements of fourth planetary gear set PG4 are integrally rotated by the operation of fourth clutch C4, thereby engaging the forward fourth speed by outputting the shifted torque, input to eighth shaft TM8 through first transfer gear TF1 which is connected with second shaft TM2, through output shaft OS connected with ninth shaft TM9 without shifting.

In the forward fifth speed shift-stage D5, first brake B1 is released and the first clutch C1 is engaged while controlling the forward fourth speed shift-stage D4. As a result, when input shaft IS is connected with sixth shaft TM6 by the operation of first clutch C1, the torque of input shaft IS is input to third shaft TM3 and sixth shaft TM6, and first shaft TM1 is connected with fifth shaft TM5 by the operation of second clutch C2 in the main shifting assembly.

At this time, first shaft TM1 and fifth shaft TM5 rotate together in the main shifting assembly, such that the torque being input to third shaft TM3 is shifted by first planetary gear set PG1 and then is input to eighth shaft TM8 of the auxiliary shifting assembly through first transfer gear TF1 connected with second shaft TM2.

In addition, the torque being input to sixth shaft TM6 is shifted by third planetary gear set PG3 in the main shifting assembly and then is input to tenth shaft TM10 of the auxiliary shifting assembly through second transfer gear TF2 connected with seventh shaft TM7.

In this case, in the auxiliary shifting assembly, the rotational elements of fourth planetary gear set PG4 are integrally rotated by the operation of fourth clutch C4, thereby engaging the forward fifth speed by outputting the shifted torques being input to eighth shaft TM8 and tenth shaft TM10 through output shaft OS connected with ninth shaft TM9 without shifting.

In the forward sixth speed shift-stage D6, second clutch C2 is released and third clutch C3 is engaged while controlling the forward fifth speed shift-stage D5. As a result, when input shaft IS is connected with sixth shaft TM6 by the operation of first clutch C1, the torque of input shaft IS is input to third shaft TM3 and sixth shaft TM6, and first shaft TM1 is connected with sixth shaft TM6 by the operation of third clutch C3, thereby integrally rotating first planetary gear set PG1 in the main shifting assembly.

At this time, first shaft TM1 and sixth shaft TM6 rotate together in the main shifting assembly, such that the torque being input to third shaft TM3 is input to eighth shaft TM8 of the auxiliary shifting assembly through first transfer gear TF1 connected with second shaft TM2 without shifting.

In addition, the torque being input to first shaft TM1 through sixth shaft TM6 is shifted by third planetary gear set PG3 in the main shifting assembly and then is input to tenth shaft TM10 of the auxiliary shifting assembly through second transfer gear TF2 connected with seventh shaft TM7.

In this configuration, in the auxiliary shifting assembly, the rotational elements of fourth planetary gear set PG4 are integrally rotated by the operation of fourth clutch C4, thereby engaging the forward sixth speed by outputting the shifted torques being input to eighth shaft TM8 and tenth shaft TM10 through output shaft OS connected with ninth shaft TM9 without shifting.

In the forward seventh speed shift-stage D7, fourth clutch C4 is released and second clutch C2 is engaged while controlling the forward sixth speed shift-stage D6. As a result, when input shaft IS is connected with sixth shaft TM6 by the operation of first clutch C1, the torque of input shaft IS is input to third shaft TM3 and sixth shaft TM6, and first shaft TM1 is connected with fifth and sixth shafts TM5 and TM6 by the operation of second and third clutches C2 and C3, thereby integrally rotating first and second planetary gear sets PG1 and PG2 in the main shifting assembly.

At this time, first shaft TM1, sixth shaft TM6, and fifth shaft TM5 rotate together in the main shifting assembly, such that the torque being input to third shaft TM3 is input to eighth shaft TM8 of the auxiliary shifting assembly through first transfer gear TF1 connected with second shaft TM2 after being shifted by first planetary gear set PG1, and the torque being input to sixth shaft TM6 is input to tenth shaft TM10 of the auxiliary shifting assembly through second transfer gear TF2 connected with seventh shaft TM7 after being shifted by third planetary gear set PG3.

In this configuration, in the auxiliary shifting assembly, the torques being input to eighth shaft TM8 and tenth shaft TM10 are shifted by fourth planetary gear set PG4 depending on the difference in rotation speeds, thereby engaging the forward seventh speed by outputting the shifted torque through output shaft OS connected with ninth shaft TM9.

In the forward eighth speed shift-stage D8, second clutch C2 is released and second brake B2 is engaged while controlling the forward seventh speed shift-stage D7. As a result, when input shaft IS is connected with sixth shaft TM6 by the operation of first clutch C1, the torque of input shaft IS is input to third shaft TM3 and sixth shaft TM6, and first shaft TM1 is connected with sixth shaft TM6 by the operation of third clutch C3, thereby integrally rotating first planetary gear set PG1 in the main shifting assembly.

At this time, first shaft TM1 and sixth shaft TM6 rotate together, and fourth shaft TM4 acts as a fixed element in the main shifting assembly, such that the torques being input to third shaft TM3, first shaft TM1, and sixth shaft TM6 are shifted by the first, second, and third planetary gear sets PG1, PG2, and PG3, and then is input to eighth shaft TM8 of the auxiliary shifting assembly through first transfer gear TF1 connected with second shaft TM2, and simultaneously, is input to tenth shaft TM10 of the auxiliary shifting assembly through second transfer gear TF2 connected with seventh shaft TM7.

In this configuration, in the auxiliary shifting assembly, the torques being input to eighth shaft TM8 and tenth shaft TM10 are shifted by fourth planetary gear set PG4 depending on the difference in rotation speeds, thereby engaging the forward eighth speed by outputting the shifted torque through output shaft OS connected with ninth shaft TM9.

In the forward ninth speed shift-stage D9, third clutch C3 is released and the second clutch C2 is engaged while controlling the forward eighth speed shift-stage D8. As a result, when input shaft IS is connected with sixth shaft TM6 by the operation of first clutch C1, the torque of input shaft IS is input to third shaft TM3 and sixth shaft TM6, and first shaft TM1 is connected with fifth shaft TM5 by the operation of second clutch C2.

At this time, first shaft TM1 and fifth shaft TM5 rotate together, and fourth shaft TM4 acts as a fixed element in the main shifting assembly, such that the torque being input to third shaft TM3 is input to eighth shaft TM8 of the auxiliary shifting assembly through first transfer gear TF1 connected with second shaft TM2 after being shifted by the first and second planetary gear sets PG1 and PG2 and the torque being input to sixth shaft TM6 is input to tenth shaft TM10 of the auxiliary shifting assembly through second transfer gear TF2 connected with seventh shaft TM7 after being shifted by third planetary gear set PG3.

In this case, in the auxiliary shifting assembly, the torques being input to eighth shaft TM8 and tenth shaft TM10 are shifted by fourth planetary gear set PG4 depending on the difference in rotation speeds, thereby engaging the forward ninth speed by outputting the shifted torque through output shaft OS connected with ninth shaft TM9.

In the reverse speed shift-stage REV, third clutch C3 and first and second brakes B1 and B2 are simultaneously engaged. As a result, when first shaft TM1 is connected with sixth shaft TM6 by the operation of third clutch C3, fifth shaft TM5 and fourth shaft TM4 act as fixed elements by the operation of first and second brakes B1 and B2, thereby fixing the whole second planetary gear set PG2.

At this time, the torque being input to third shaft TM3 is shifted by first and third planetary gear sets PG1 and PG3 in the main shifting assembly and then is input to tenth shaft TM10 of the auxiliary shifting assembly through second transfer gear TF2 connected with seventh shaft TM7.

In this case, in the auxiliary shifting assembly, eighth shaft TM8 acts as a fixed element together with second shaft TM2 by the operation of first and second brakes B1 and B2, thereby engaging the reverse speed by outputting the shifted torque being input to tenth shaft TM10 through output shaft OS connected with ninth shaft TM9 after shifting by fourth planetary gear set PG4.

FIG. 2 shows gear ratios calculated under the condition that the gear ratio of first ring gear R1 to first sun gear S1 is 1.60; the gear ratio of second ring gear R2 to second sun gear S2 is 2.71; the gear ratio of third ring gear R3 to third sun gear S3 is 3.42; the gear ratio of fourth ring gear R4 to fourth sun gear S4 is 1.63; the gear ratio of first transfer driven gear TF1$b$ to first transfer drive gear TF1$a$ is 1.10; and the gear ratio of the second transfer driven gear TF2$b$ to second transfer drive gear TF2$a$ is 0.84.

Figure 3:
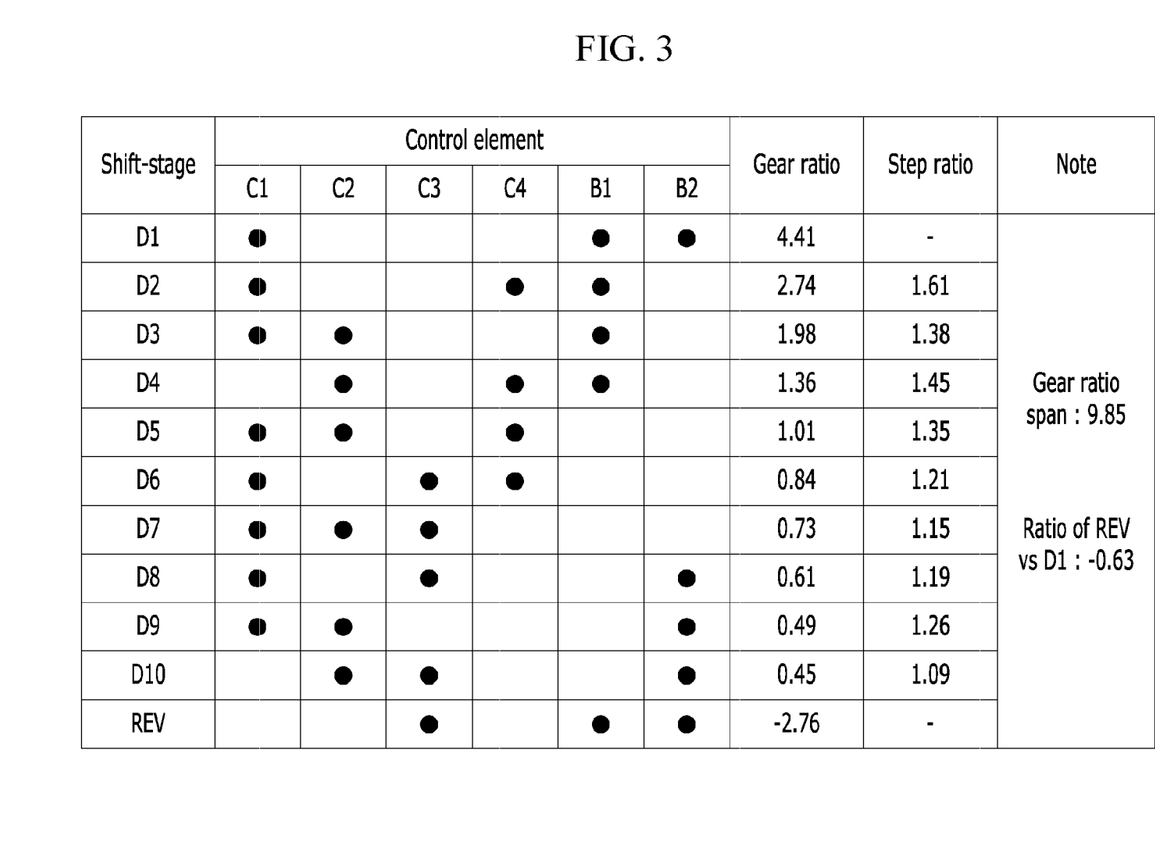
FIG. 3 is an operational chart for the respective control elements at respective shift-stages in a planetary gear train according to a first example embodiment that provides ten forward drive speeds and a reverse speed.

FIG. 3 is an operational chart for respective control elements at respective shift-stages in a planetary gear train according to a first example embodiment that provides ten forward drive speeds and a reverse speed.

Referring to FIG. 3, a planetary gear train according a second example embodiment provides ten forward speeds and one reverse speed by operating three control elements among the first, second, third, and fourth clutches C1, C2, C3, and C4 and the first and second brakes B1 and B2 at respective shift-stages.

In this example embodiment, the forward first speed shift-stage D1 to the forward ninth speed shift-stage D9 are same as previously described for the first example embodiment. The forward tenth speed shift-stage D10 is engaged by releasing first clutch C1 and engaging third clutch C3 while controlling the forward ninth speed shift-stage D9.

In the forward tenth speed shift-stage D10, as shown in FIG. 3, first clutch C1 is released and third clutch C3 is engaged while controlling the forward ninth speed shift-stage D9. As a result, first shaft TM1, sixth shaft TM6, and fifth shaft TM5 rotate together in the main shifting assembly, and fourth shaft TM4 acts as a fixed element, such that the torque being input to third shaft TM3 is input to eighth shaft TM8 of the auxiliary shifting assembly through first transfer gear TF1 connected with second shaft TM2 after being shifted by the first and second planetary gear sets PG1 and PG2 and the torque being shifted by third planetary gear set PG3 is input to tenth shaft TM10 of the auxiliary shifting assembly through second transfer gear TF2 connected with seventh shaft TM7.

In this configuration, in the auxiliary shifting assembly, the torques being input to eighth shaft TM8 and tenth shaft TM10 are shifted by fourth planetary gear set PG4 depending on the difference in rotation speeds, thereby engaging the forward tenth speed by outputting the shifted torque through output shaft OS connected with ninth shaft TM9.

FIG. 3 shows gear ratios calculated under the conditions that the gear ratio of first ring gear R1 to first sun gear S1 is 1.60; the gear ratio of second ring gear R2 to second sun gear S2 is 2.71; the gear ratio of third ring gear R3 to third sun gear S3 is 3.07; the gear ratio of fourth ring gear R4 to fourth sun gear S4 is 1.63; the gear ratio of first transfer driven gear TF1*b* to first transfer drive gear TF1*a* is 0.84; and the gear ratio of second transfer driven gear TF2*b* to second transfer drive gear TF2*a* is 0.67.

Figure 4:
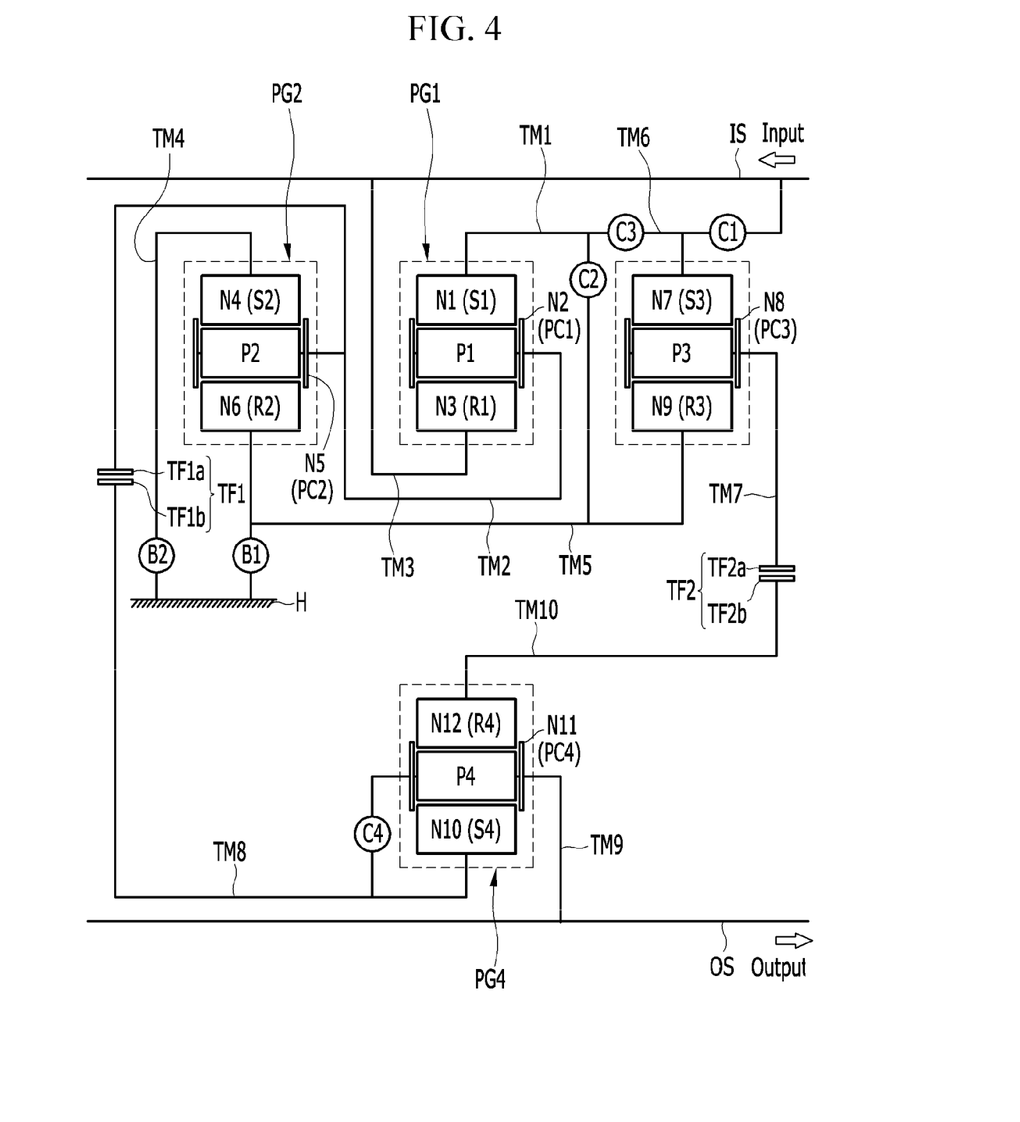
FIG. 4 is a schematic diagram of a planetary gear train according to a second example embodiment.

FIG. 4 is a schematic diagram of a planetary gear train according to a second example embodiment.

Referring to FIG. 4, the example planetary gear train is configured so that fourth clutch C4 disposed between eighth shaft TM8 and ninth shaft TM9, as compared to the example embodiment of FIG. 1, where fourth clutch C4 is disposed between eight shaft TM 8 and tenth shaft TM10. While fourth clutch C4 is differently disposed in the second embodiment, the general operation and shift pattern are the same as with respect to FIG. 1.

Figure 5:
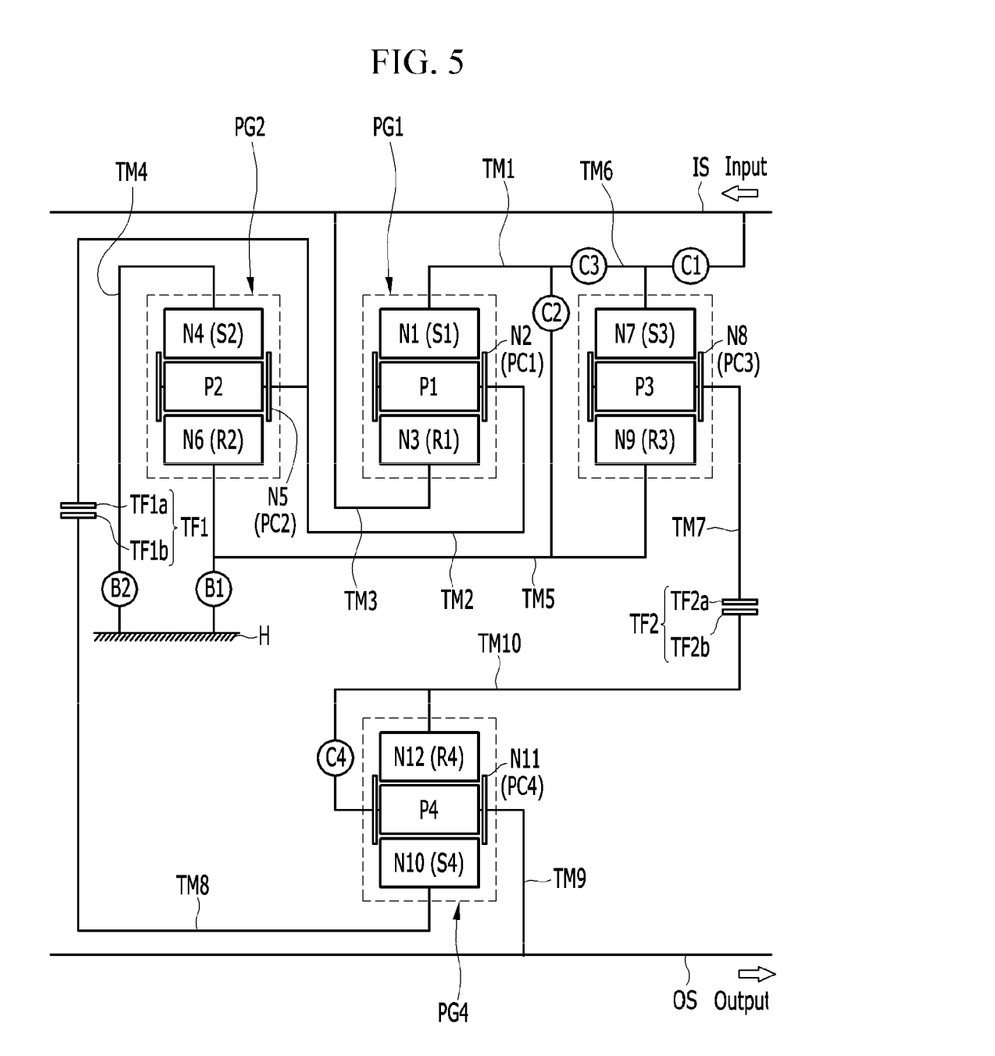
FIG. 5 is a schematic diagram of a planetary gear train according to a third example embodiment.

FIG. 5 is a schematic diagram of a planetary gear train according to a third example embodiment.

As with FIG. 4, the position of fourth clutch C4 is different between the first, second and third embodiments. Referring to FIG. 5, fourth clutch C4 is disposed between the ninth shaft TM9 and the tenth shaft TM10. While fourth clutch C4 is differently disposed in the second embodiment, the general operation and shift pattern are the same as with respect to FIG. 1.

As described above, a planetary gear train according to an example embodiment provides at least nine forward speeds and at least one reverse speed by a combination of four planetary gear sets, two transfer gears, and six control elements, thereby providing improvement of power delivery performance and fuel consumption and improving ease of installation by shortening the length for an automatic transmission.

In addition, a planetary gear train according to an example embodiment, two transfer gears of external gears arranged on output shaft OS are employed in addition to three planetary gear sets, and thus, gear teeth may be widely varied so as to easily achieve an optimum gear ratio and to provide desired performance characteristics for the vehicle.

Further, in a planetary gear train according to an example embodiment of the present invention, a gear ratio span of more than 9.5 may be achieved while realizing at least nine forward speeds and one reverse speed, thereby maximizing engine driving efficiency.

Furthermore, the linearity of step ratios of shift stages is secured while multi-staging the shift stage with high efficiency, thereby making it possible to improve drivability such as acceleration before and after a shift, engine speed rhythmic feel, and the like.

While this invention has been described in connection with practical example embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear train for an automatic transmission vehicle, comprising:
    a first planetary gear set having first, second, and third rotational elements;
    a second planetary gear set having fourth, fifth, and sixth rotational elements;
    a third planetary gear set having seventh, eighth, and ninth rotational elements;
    a fourth planetary gear set having tenth, eleventh, and twelfth rotational elements;
    a first transfer gear comprising a first transfer drive gear and a first transfer driven gear;
    a second transfer gear comprising a second transfer drive gear and a second transfer driven gear;
    an input shaft mounted with the first, second, and third planetary gear sets on an external circumference of the input shaft; and
    an output shaft disposed in parallel with the input shaft and mounted with the fourth planetary gear set on an external circumference of the output shaft,
    wherein:
    the second rotational element and the fifth rotational element are connected with the tenth rotational element through the first transfer gear;
    the third rotational element is connected with the input shaft;
    the eighth rotational element is connected with the twelfth rotational element through the second transfer gear; and
    the eleventh rotational element is connected with the output shaft.

2. The planetary gear train of claim 1, further comprising:
    a first shaft connected with the first rotational element;
    a second shaft connected with the second rotational element, the fifth rotational element, and the first transfer drive gear;
    a third shaft connected with the third rotational element and the input shaft;
    a fourth shaft connected with the fourth rotational element;
    a fifth shaft connected with the sixth rotational element and the ninth rotational element;

a sixth shaft connected with the seventh rotational element;
a seventh shaft connected with the eighth rotational element and the second transfer drive gear;
an eighth shaft connected with the tenth rotational element and the first transfer driven gear;
a ninth shaft connected with the eleventh rotational element and the output shaft; and
a tenth shaft connected with the twelfth rotational element and the second transfer driven gear.

3. The planetary gear train of claim 2, wherein:
the first shaft is selectively connected with the fifth shaft and is selectively connected with the sixth shaft;
the fourth shaft is selectively connected to a transmission housing;
the fifth shaft is selectively connected to the transmission housing; and
the sixth shaft is selectively connected with the input shaft.

4. The planetary gear train of claim 3, wherein the fourth planetary gear set is integrally rotatable by selectively connecting two shafts selected from the eighth, ninth, and tenth shafts.

5. The planetary gear train of claim 4, further comprising:
a first clutch arranged between the input shaft and the sixth shaft;
a second clutch arranged between the first shaft and the fifth shaft;
a third clutch arranged between the first shaft and the sixth shaft;
a fourth clutch arranged between the eighth shaft and the tenth shaft;
a first brake arranged between the fifth shaft and the transmission housing; and
a second brake arranged between the fourth shaft and the transmission housing.

6. The planetary gear train of claim 4, further comprising:
a first clutch arranged between the input shaft and the sixth shaft;
a second clutch arranged between the first shaft and the fifth shaft;
a third clutch arranged between the first shaft and the sixth shaft;
a fourth clutch arranged between the eighth shaft and the ninth shaft;
a first brake arranged between the fifth shaft and the transmission housing; and
a second brake arranged between the fourth shaft and the transmission housing.

7. The planetary gear train of claim 4, further comprising:
a first clutch arranged between the input shaft and the sixth shaft;
a second clutch arranged between the first shaft and the fifth shaft;
a third clutch arranged between the first shaft and the sixth shaft;
a fourth clutch arranged between the ninth shaft and the tenth shaft;
a first brake arranged between the fifth shaft and the transmission housing; and
a second brake arranged between the fourth shaft and the transmission housing.

8. The planetary gear train of claim 1, wherein:
the first planetary gear set comprises a first sun gear as the first rotational element, a first planet carrier as the second rotational element, and a first ring gear as the third rotational element;
the second planetary gear set comprises a second sun gear as the fourth rotational element, a second planet carrier as the fifth rotational element, and a second ring gear as the sixth rotational element;
the third planetary gear set comprises a third sun gear as the seventh rotational element, a third planet carrier as the eighth rotational element, and a third ring gear as the ninth rotational element;
the fourth planetary gear set comprises a fourth sun gear as the tenth rotational element, a fourth planet carrier as the eleventh rotational element, and a fourth ring gear as the twelfth rotational element;
the first transfer driven gear is externally gear-meshed with the first transfer drive gear; and
the second transfer driven gear is externally gear-meshed with the second transfer drive gear.

9. A planetary gear train for an automatic transmission vehicle, comprising:
a first planetary gear set having first, second, and third rotational elements;
a second planetary gear set having fourth, fifth, and sixth rotational elements;
a third planetary gear set having seventh, eighth, and ninth rotational elements;
a fourth planetary gear set having tenth, eleventh, and twelfth rotational elements;
an input shaft mounted with the first, second, and third planetary gear sets on an external circumference of the input shaft; and
an output shaft disposed in parallel with the input shaft and mounted with the fourth planetary gear set on an external circumference of the output shaft,
wherein the second rotational element is connected with the fifth rotational element,
the third rotational element is connected with the input shaft,
the fourth rotational element is selectively connected to a transmission housing,
the sixth rotational element is connected with the ninth rotational element and selectively connected with the transmission housing,
the tenth rotational element is externally gear-meshed with the fifth rotational element,
the eleventh rotational element is connected with the output shaft, and
the twelfth rotational element is externally gear-meshed with the eighth rotational element.

10. The planetary gear train of claim 9, wherein:
the input shaft is selectively connected with the seventh rotational element;
the first rotational element is selectively connected with the seventh rotational element and selectively connected with the ninth rotational element; and
the tenth rotational element is selectively connected with the twelfth rotational element.

11. The planetary gear train of claim 10, further comprising:
a first clutch arranged between the input shaft and the seventh rotational element;
a second clutch arranged between the first rotational element and the ninth rotational element;
a third clutch arranged between the first rotational element and the seventh rotational element;
a fourth clutch arranged between the tenth rotational element and the twelfth rotational element;
a first brake arranged between the sixth rotational element and the transmission housing; and a second brake arranged between the fourth rotational element and the transmission housing.

12. The planetary gear train of claim 9, wherein:
the input shaft is selectively connected with the seventh rotational element;
the first rotational element is selectively connected with the seventh rotational element and selectively connected with the ninth rotational element; and
the tenth rotational element is selectively connected with the eleventh rotational element.

13. The planetary gear train of claim 12, further comprising:
a first clutch arranged between the input shaft and the seventh rotational element;
a second clutch arranged between the first rotational element and the ninth rotational element;
a third clutch arranged between the first rotational element and the seventh rotational element;
a fourth clutch arranged between the tenth rotational element and the eleventh rotational element;
a first brake arranged between the sixth rotational element and the transmission housing; and
a second brake arranged between the fourth rotational element and the transmission housing.

14. The planetary gear train of claim 9, wherein:
the input shaft is selectively connected with the seventh rotational element;
the first rotational element is selectively connected with the seventh rotational element and selectively connected with the ninth rotational element; and
the eleventh rotational element is selectively connected with the twelfth rotational element.

15. The planetary gear train of claim 14, further comprising:
a first clutch arranged between the input shaft and the seventh rotational element;
a second clutch arranged between the first rotational element and the ninth rotational element;
a third clutch arranged between the first rotational element and the seventh rotational element;
a fourth clutch arranged between the eleventh rotational element and the twelfth rotational element;
a first brake arranged between the sixth rotational element and the transmission housing; and
a second brake arranged between the fourth rotational element and the transmission housing.

16. The planetary gear train of claim 9, wherein:
the first planetary gear set comprises a first sun gear as the first rotational element, a first planet carrier as the second rotational element, and a first ring gear as the third rotational element;
the second planetary gear set comprises a second sun gear as the fourth rotational element, a second planet carrier as the fifth rotational element, and a second ring gear as the sixth rotational element;
the third planetary gear set comprises a third sun gear as the seventh rotational element, a third planet carrier as the eighth rotational element, and a third ring gear as the ninth rotational element; and
the fourth planetary gear set comprises a fourth sun gear as the tenth rotational element, a fourth planet carrier as the eleventh rotational element, and a fourth ring gear as the twelfth rotational element.

17. The planetary gear train of claim 9, further comprising:
a first transfer gear comprising a first transfer drive gear connected with the fifth rotational element and a first transfer driven gear connected with the tenth rotational element so as to be externally gear-meshed with the first transfer drive gear; and
a second transfer gear comprising a second transfer drive gear connected with the eighth rotational element and a second transfer driven gear connected with the twelfth rotational element so as to be externally gear-meshed with the second transfer drive gear.

* * * * *